May 15, 1945.  A. C. TURTLE  2,375,965
PORTABLE POWER DRIVEN CONVEYER
Filed Nov. 25, 1943
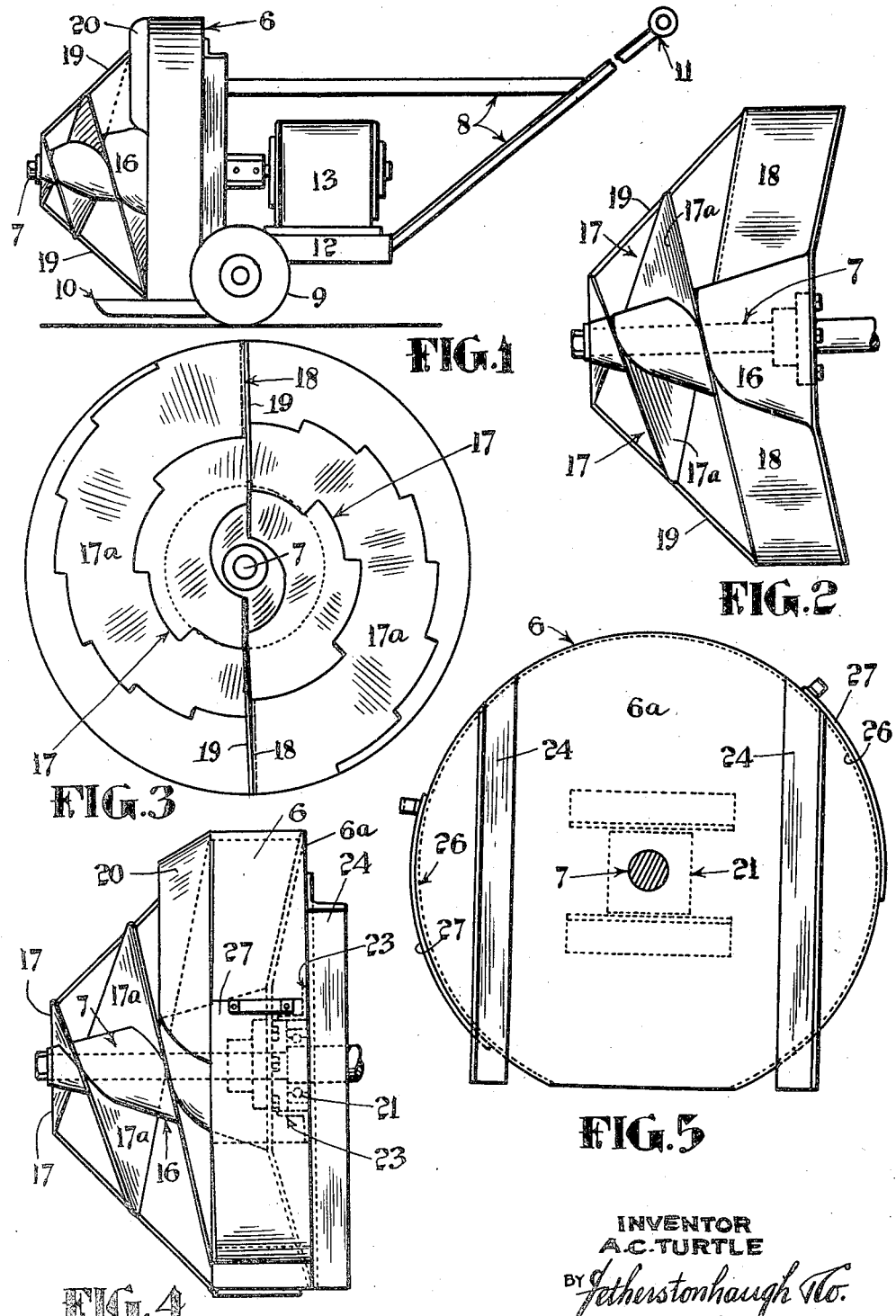
INVENTOR
A.C.TURTLE
BY Fetherstonhaugh &Co.
ATTORNEYS Patented May 15, 1945

2,375,965

UNITED STATES PATENT OFFICE 2,375,965

PORTABLE POWER-DRIVEN CONVEYER

Alfred C. Turtle, Montreal, Quebec, Canada

Application November 25, 1943, Serial No. 511,739

1 Claim. (Cl. 37—43)

This invention relates to portable power driven conveyers of the snow-plow type which are used for moving snow or other massed material from one location to another and the object is to provide a machine of this type equipped with an improved form of screw conveyer which, when advanced against a mass of snow or other material, will effect a more rapid and efficient removal of the material from one location to another than is possible with known types of screw conveyers of comparable size.

The foregoing object is achieved by providing a multiple-vane tapering screw conveyer comprising a conical spindle having its smaller end located at the front of the conveyer, said spindle carrying a plurality of vanes which are spiralled rearwardly around the spindle from the front end to an intermediate portion of the spindle and are then directed rearwardly in the axial direction of the spindle to provide integral paddle extensions by means of which material which is conveyed axially of the spindle by the spiral portions of the vanes is thrown outwardly in a substantially radial direction at the rear or larger end of the spindle when the latter is revolved by a driving shaft on which it is mounted.

Proceeding now to a more detailed description of this invention reference will be had to the accompanying drawing, wherein—

Fig. 1 is a side elevation of a portable power driven screw conveyer embodying my invention.

Fig. 2 is a detailed view showing the screw conveyor assembly and its supporting shaft in side elevation.

Fig. 3 is a front end view of the assembly shown in Fig. 2.

Fig. 4 is a side elevational view illustrating the manner in which the screw conveyer assembly and its supporting shaft are assembled with a supporting housing which encloses the paddle forming portions of the spiral conveyer vanes.

Fig. 5 is a rear end view of the assembly shown in Fig. 4.

In the drawing I have shown a screw conveyer assembly 5 enclosed at its rear end by a supporting housing 6 in which the conveyer driving shaft 7 is journalled. The housing 6 is carried by a frame structure 8 equipped with ground wheels 9 and skids 10. The frame structure 8 is propelled along the ground by means of a handle 11 and includes a platform 12 mounting a motor 13 which drives the conveyer shaft 7. If desired, any suitable form of transmission may be provided between the motor 13 and the ground wheels 9 to convert the machine into a power driven machine of the self-propelled type.

The screw conveyer assembly 5 comprises a conical spindle 16 of gradually increasing diameter towards its rear end and a plurality of vanes 17 carried by said spindle. A portion 17a of each vane is spiralled rearwardly around the spindle from the front end to an intermediate point of the spindle and is then directed rearwardly in the axial direction of shaft 7 to provide an integral paddle-forming portion 18. In the present instance I have shown two vanes 17 and the front end of each vane is welded or otherwise secured to the front end of an inclined auxiliary cutter 19, having its rear end welded or otherwise secured to paddle portion 18 of the same vane.

The paddle portions 18 of the two vanes are enclosed by the casing 6 which is provided with a forwardly projecting hood 20. The rear wall 6a of this casing is centrally apertured to permit shaft 7 to pass therethrough and is provided with a shaft bearing 21 which is preferably of the antifriction type. The rear end of shaft 7 is coupled to the motor 13 which drives the shaft and the spindle 16 so that the rotational speed of the vanes 17, at the rear or larger end of the conveyer assembly, is approximately 8,500 ft. per minute.

Two horizontally extending reinforcing angles 23 are preferably secured to the front of the rear casing wall 6a to strengthen the same and to support the shaft bearing 21. The rear side of this casing wall is also strengthened by vertically extending angles 24 to which the skids 10 may conveniently be attached.

The casing 6 is also provided with two circumferentially located discharge openings 26, each controlled by a sliding door 27.

When the machine described herein is advanced into a mass of snow or other material, the vanes 17 cut their way into the material so that the material is first conveyed rearwardly in the axial direction of shaft 7 by the spiral portions 17a and is then thrown radially at high velocity through the casing discharge openings 26 by the paddle forming portions 18. It will be noted that the distance from the circumferential surface of the conical spindle 16 to the outer edge of each vane 17 gradually increases to a maximum distance at the rear end of the spindle. This feature plus the conical form of the spindle itself results in a high velocity being imparted to the snow or other material during its relatively short path of travel from the front to the rear end of the conveyer where it is thrown centrifugally through the discharge openings of casing 6.

Having thus described what I now conceive to be the preferred embodiments of my invention, it will be understood that various modifications may be resorted to within the scope and spirit of the invention as defined by the appended claim.

I claim:

A machine of the character described comprising a portable frame structure, a power driven shaft carried thereby and extending forwardly therefrom and a multiple-vane tapering, spiral screw conveyer assembly mounted on the forwardly projecting portion of said shaft and driven thereby, said assembly comprising a conical spindle gradually decreasing in diameter towards its rear end, a plurality of vanes rigidly carried by said spindle, each vane having a portion thereof spiralled around the spindle from the front end to an intermediate portion of the spindle and having the remaining portion thereof directed rearwardly in the axial direction of said shaft and extending from said intermediate portion to the rear end of the spindle and a pair of inclined cutter bars extending longitudinally of said spindle in spaced relation thereto, each cutter bar having its front end secured to the front end of one vane and its rear end secured to the rear paddle-forming portion of the same vane.

ALFRED C. TURTLE.